Feb. 9, 1937.   G. L. MURRAY   2,069,921
MACHINE TOOL FOR PERFORMING OPERATIONS ON METAL OR OTHER SUBSTANCES
Filed Feb. 6, 1935   4 Sheets-Sheet 1
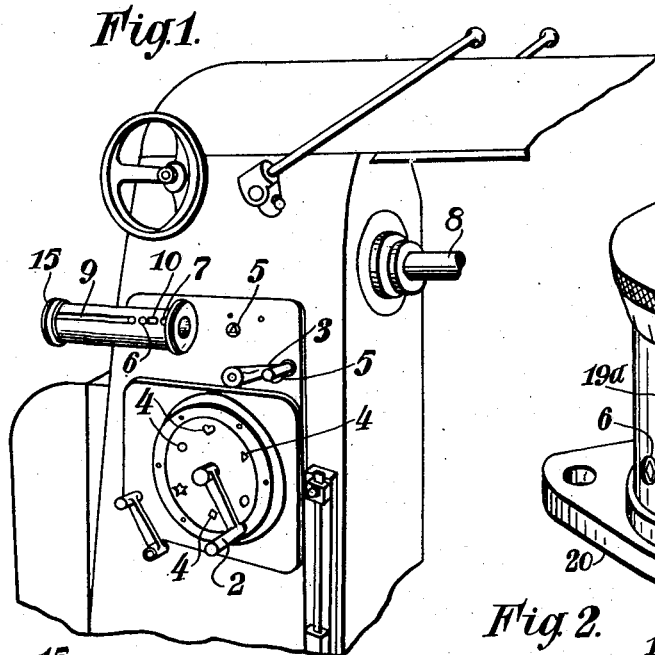
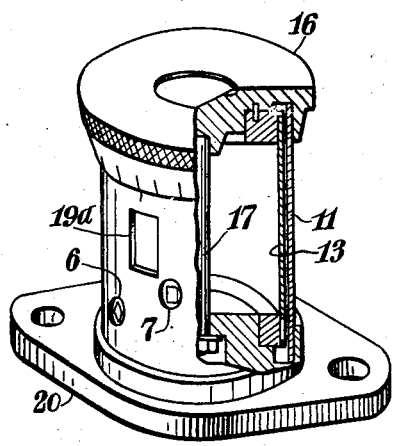
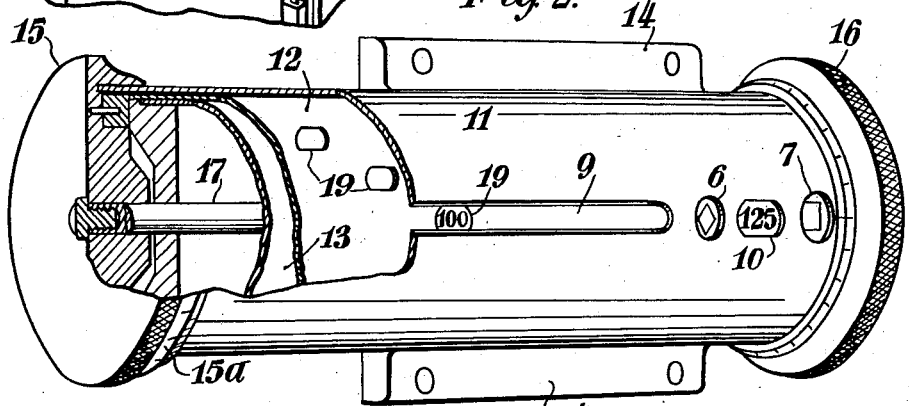
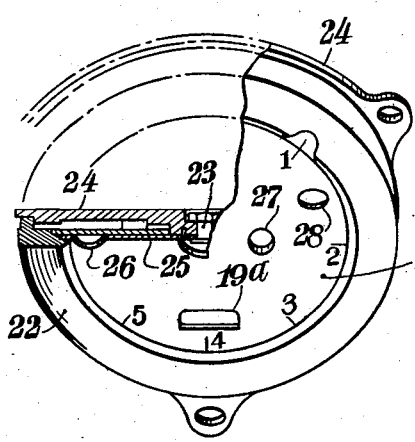

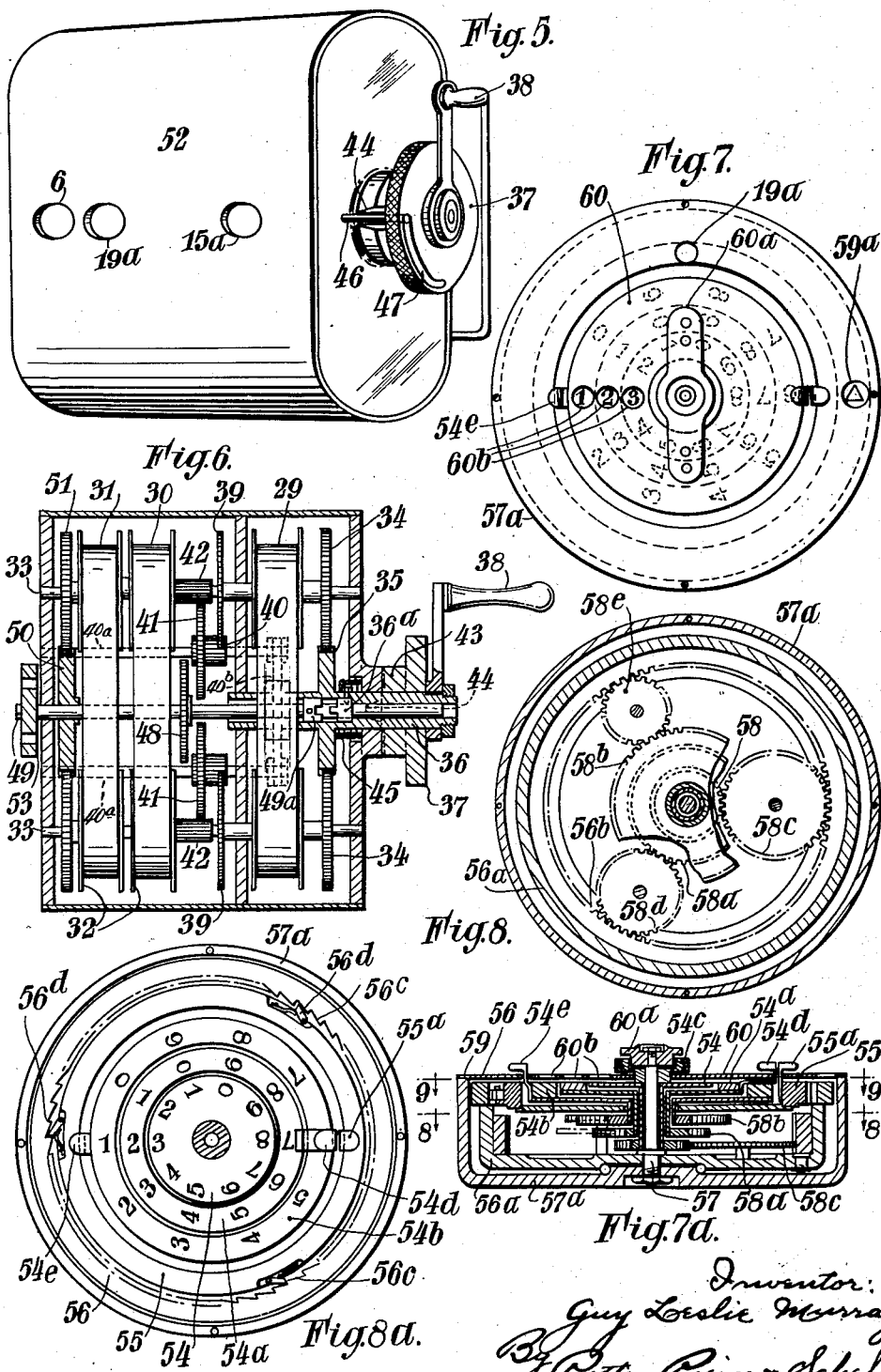

Feb. 9, 1937.  G. L. MURRAY  2,069,921
MACHINE TOOL FOR PERFORMING OPERATIONS ON METAL OR OTHER SUBSTANCES
Filed Feb. 6, 1935   4 Sheets-Sheet 3
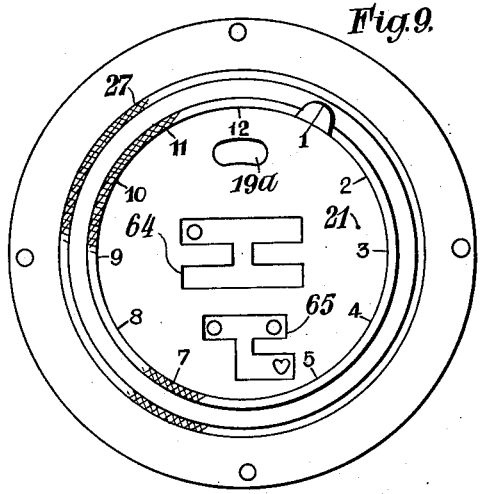
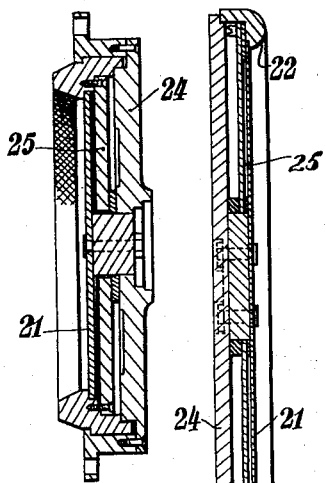
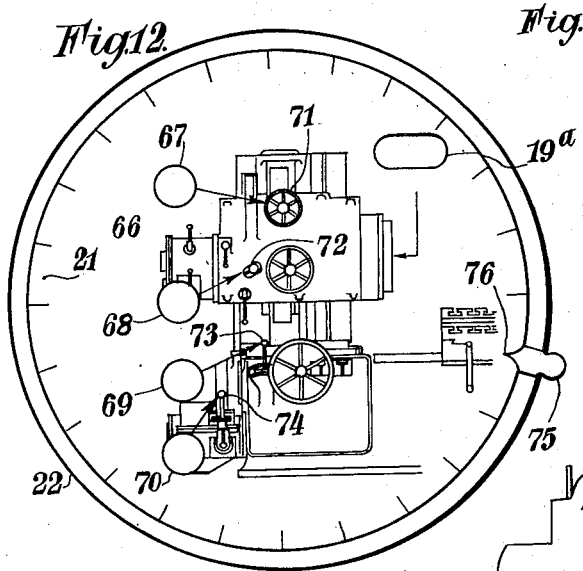
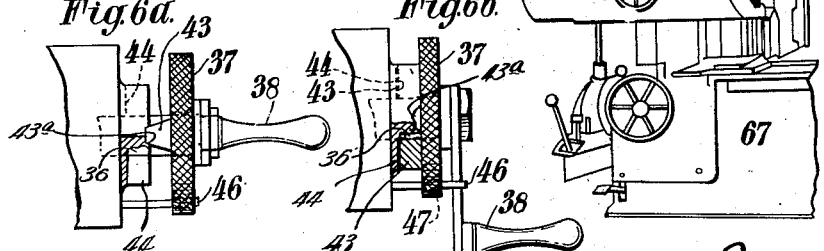

Feb. 9, 1937.                G. L. MURRAY                 2,069,921
MACHINE TOOL FOR PERFORMING OPERATIONS ON METAL OR OTHER SUBSTANCES
                Filed Feb. 6, 1935          4 Sheets-Sheet 4

Inventor:
Guy Leslie Murray,
By Potter, Pierce & Scheffler
Attorneys.

Patented Feb. 9, 1937

2,069,921

UNITED STATES PATENT OFFICE 2,069,921

MACHINE TOOL FOR PERFORMING OPERATIONS ON METAL OR OTHER SUBSTANCES

Guy Leslie Murray, Leeds, England, assignor to Murray Colour Controls Limited, London, England, a company of Great Britain and Northern Ireland Application February 6, 1935, Serial No. 5,286
In Great Britain February 8, 1934

18 Claims. (Cl. 177—311)

This invention relates to machine tools and more particularly to means for facilitating the operation of the control handle or handles.

The present tendency in modern machine tool construction is to introduce an ever increasing number of speeds, feeds or other motions with their attendant control handles and as a consequence the necessary information given on the usual speed and feed instruction plates becomes more extensive and complicated. The information on such instruction plates takes the form of letters and figures, which are often not understood in workshops employing illiterate labor, or in workshops in which the language stated on the machine is not understood.

The object of this invention is to avoid the confusion and uncertainty that arises in the interpretation of existing information on such instruction plates and the time lost in interpreting the various figures and letters, by adopting a method of visual identification, whereby the information is conveyed to the mind of the operator in the form of distinctive indications capable of being universally understood.

According to the invention the correct setting of the control handle or handles is indicated by means of a group or series of shape and/or color indications applied either to the control handles, to the machine itself, or to both the control handles and the machine.

The invention embraces the method of facilitating the operation of the control handle or handles, consisting in applying to the appropriate parts of the machine a group or series of distinctive characteristic shape and/or color indications, whereby the correct setting of the said control handle or handles may be readily seen.

The invention may further include in a machine tool having one or more control handles movable to a group or series of different positions to control the operation of the machine, distinctive characteristic shape and/or color indications associated therewith to show the correct positions for setting said control handle or handles.

According to a further feature of the invention there is provided in or for a machine tool, a control indicator adapted to display, upon being set to given working requirements, one or more distinctive characteristic indications, which show the correct positions or setting for the control handle or handles, either directly or by means of corresponding indications on or adjacent to the said control handle or handles.

The term "control handle" is to be construed as including all control members employed on machine tools, such as hand- or foot-operated levers, wheels, discs, pedals, plungers, knobs or equivalent devices.

The term "characteristic indication" in this specification shall be construed as including any symbol, sign, device or marking whether colored or otherwise. Letters or numerals may be employed for differentiating several identical indications. For example, a number of handles and/or points adjacent thereto may each be marked with a diamond and the several diamonds individually identified by means of letters or numerals.

Referring now to the accompanying drawings the several figures show, by way of example only, various embodiments of the invention applied to machine tools:—

Fig. 1 shows a part perspective view of a milling machine with an embodiment of this invention applied thereto;

Fig. 2 shows an enlarged part sectional perspective view of the control indicator shown in Fig. 1;

Fig. 3 shows a part sectional perspective view of a modified control indicator;

Fig. 4 shows a part sectional perspective front elevation of a control indicator of the flat dial type;

Figs. 5 and 6 show a perspective view and a sectional front elevation of a control indicator modified to show a large range of indications;

Figure 14:
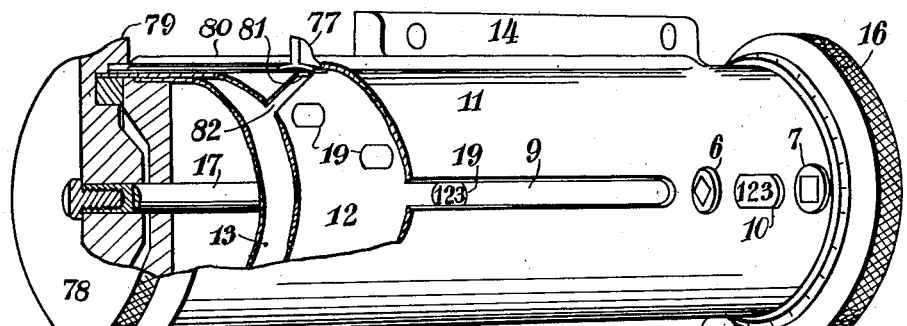
Figure 15:
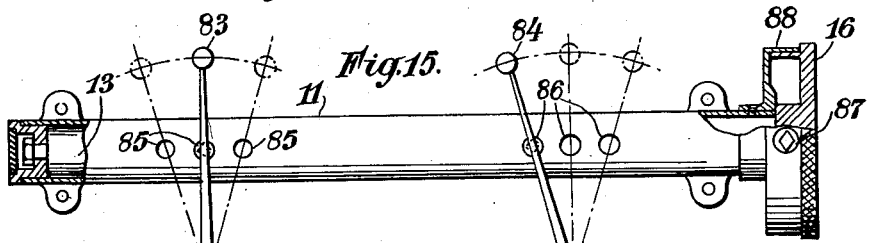
Figure 17:
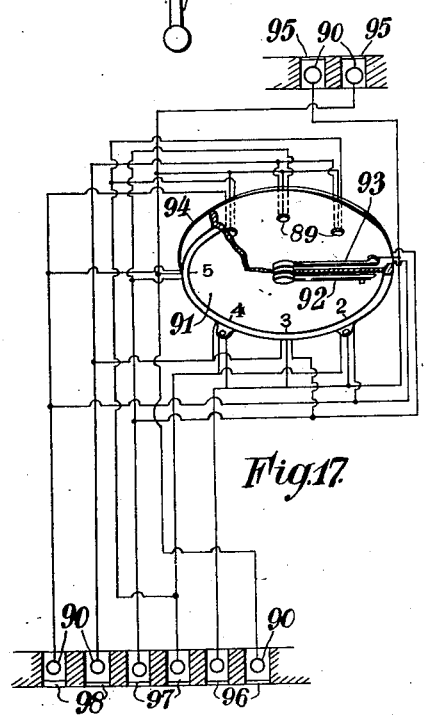
Figure 16:
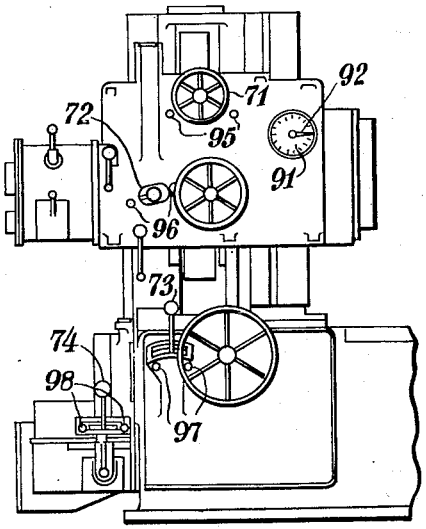

Fig. 6ª is a fragmentary view of the indicator shown in Figs. 5 and 6, partly in section, and showing the parts as viewed from a plane above Fig. 6;

Fig. 6ᵇ is a similar view but showing the adjusting handle and disk of the indicator in their inward positions after rotation of the disk through 90° and the handle through 270°;

Figs. 7 and 7ª show a front elevation and a sectional side elevation of a further form of control indicator;

Figs. 8 and 8ª are sections on the lines 8—8 and 9—9 respectively in Fig. 7ª;

Figs. 9 and 10 show a front and a sectional side elevation of a modified construction of the control indicator shown in Fig. 4;

Fig. 11 is a perspective view of a machine tool with a modified control indicator associated with a number of control handles;

Figs. 12 and 13 show an enlarged front elevation and a sectional side elevation of the control indicator shown in Fig. 11;

Fig. 14 shows a modification of the control indicator shown in Fig. 2 incorporating an adjustable gauge device;

Fig. 15 shows a part sectional front elevation of a control indicator adapted to show a visual indication adjacent the control handles;

Fig. 16 shows a perspective view of a machine tool incorporating electrically operated visual indicating means;

Fig. 17 shows a part sectional perspective view of the control indicator and a diagrammatic wiring arrangement.

Like parts in all the views are marked with like reference numerals.

The invention may be applied, for example, to a milling machine where the usual controls are by means of levers and handles which, either independently, or in combination, govern the speed at which the milling cutter revolves and the rate of feed imparted to the work being cut. Such control handles at present are used for the following, viz:— regulating the speed of the cutter; regulating the automatic movement of the work; hand motions to the various slides which are used for primary adjustment; giving rapid traverse to the work-tables; reversing the direction of the work-tables or the cutter; and also handles for locking the various work-tables in position.

In order to operate these various control handles in correct sequence and/or combination, there is provided on or adjacent to the series of control handles a distinctive characteristic indication comprising any, or a combination of, the following, namely, shaped symbols or colored symbols, either in the form of recesses, protuberances or insertions. The said symbols may be applied to any convenient part of the control handles to indicate the resulting movement. Where the particular control handle performs a combination of functions, a combination of symbols to correspond may be provided. If so desired the handle in itself may assume a distinctive characteristic shape and/or color and may combine with the above indications.

It will be appreciated that the indications may be provided either on the movable control handles themselves, or on a stationary part of the machine, or on both so as to afford a relative reading between them.

In Figs. 1 and 2 a control indicator is shown of drum formation and adapted to control the setting of the machine spindle control handle 2 and the fast and slow speed handle 3. As shown characteristic indications 4, 5, in the form of colored or other symbols are formed or fixed at given points adjacent the control handles 2 and 3. To determine opposite which of the indications the handles 2, 3, should be set, the control indicator drum is employed.

The latter is shown in detail in Fig. 2 and comprises a stationary outer casing 11, and an inner cylindrical shutter 12, which turns about an indicator drum 13 carrying indications and numerals indicative of various cutting speeds on its outer surface. The casing 11 is furnished with fixing brackets 14 and rotatable discs 15, 16 at its ends for respectively rotating the shutter 12 and the drum 13. The two discs 15, 16 are connected and retained in position by a central rod 17 secured to the disc 16 and allowing the disc 15 to rotate upon its opposite end.

The discs 15 and 16 are graduated with the diameters of cutters on the one disc and serial numbers for cutting speeds on the other disc with zero markings on the casing 11.

Assuming that the operator knows the given working requirements, such as the diameter of the cutter (or of the work) and the cutting speed in feet per minute required, he first sets the indicator to such requirements by manipulating the disc 15 till the desired cutter diameter on the scale 15ᵃ comes opposite the zero marking on the casing 11 and in so doing he rotates the shutter 12 causing one of a number of windows 19 in the shutter 12 to register with the slot 9. The disc 16 is then rotated until the correct cutting speed is displayed in the long slot 9 through the window 19.

Having thus set the indicator to the working requirements, the characteristic indications appear in the windows 6 and 7, (in this case a diamond and a square respectively) thus giving a visual indication to the operator to set the control handles opposite the corresponding indications adjacent thereto.

Incidentally in the window 10 appears a figure indicative of the revs. per min. of the machine spindle 8.

If desired the scale 15ᵃ may be graduated in the terms of the diameter of the work instead of in terms of cutter diameters.

Fig. 3 shows a modification of the drum control adapted to show the position of two control handles governing, say, the rate of feed. The casing 11 and disc 16 in this construction are anchored to a bracket 20 employed for securing the drum control in a vertical, horizontal or angular position on a machine tool.

To operate the indicator, the disc 16 is manipulated till the desired rate of feed appears in the window 19ᵃ, whereupon indications appear in the windows 6, 7.

Fig. 4 shows a further modified control indicator of dial formation wherein a front plate 21 is retained by a ring 22 and a central pin 23 anchored to a stationary back plate 24. An indicator dial 25 is mounted upon the back plate 24 and rotated by the ring 22.

The front plate 21 is graduated with serial numbers indicative of the range of available cutting speeds. The dial 25 is rotated until the desired cutting speed appears in the window 19ᵃ, whereupon indications appear in the windows 26, 27 and 28.

Figs. 5, 6, 6ᵃ and 6ᵇ show a control indicator of the band type which is adapted to provide a larger range of indications than is permissible upon a drum. As illustrated tapes 29, 30, 31, which may be endless or otherwise and of the same or different lengths, are mounted upon flanged pulleys 32 carried by spindles 33. The arrangement is such that the tapes 29, 30 may be rotated in unison and subsequently tapes 30, 31 are rotated together. Tape 29 is rotated by the gear wheel 34 operated by the gear 35 movable laterally with a sleeve 36 which is held against inward movement by the disc 37 which is rotatably mounted on the sleeve between the indicator casing and the handle 38 secured on the end of the sleeve. The sleeve is rotated by the handle 38 and the resulting rotation of tape 29 rotates tape 30 through gear 39, pinions 40, gears 41 and pinions 42 whereby the diameter of the work in hand, or of the cutter, is displayed in the window 15ᵃ and the tape 30 is automatically set so that a particular portion of it showing a characteristic series of cutting speeds for such diameter is available for display through window 19ᵃ. The disc 37 has radial projections 43 which are normally seated in shallow recesses 43ᵃ in the end of the indicator casing (Fig. 6ᵃ) and which, by rotating disc 37 a quarter turn, may be brought into register with slots 44 in the casing to permit an inward movement of sleeve 36 by the spring 45. The normal tendency of the spring 45 is to thrust the gear 35, sleeve 36 and handle 38 inwardly as one unit and, as the handle presses against the disc 37, immediately the projections 43 enter the slots 44 the handle moves inwardly with the disc so that the gear 35 becomes disengaged from the gears 34. The drive to the tape 29 may thus be disconnected when the desired portion of tape 30 appears in window 19a by rotating the disc 37 into the position shown in Fig. 6b. With the parts in this adjustment, rotary movement of disc 37 is limited by the rigid pin 46 located in the slot 47, and when the disc moves to its inward position the pin projects so as to limit the rotation of the handle 38 resulting in the tape 30 being rotatable only through a limited distance corresponding to the aforesaid series of speeds. In this manner, only the aforesaid portion of the tape is capable of movement past the window 19a resulting in a definite series of speeds being available for selection and display through such window. The said inward movement of the disc moves the pinions 40 into mesh with the gear 48, secured to the central spindle 49, by means of the carrier spindles 40a secured to the member 40b which is anchored on the sleeve 30 so as to move laterally therewith but allow the sleeve to rotate therein. Such inward movement connects the central spindle 49 up to the sleeve 36 by means of the jaw 49a pinned to the spindle 49 being engaged by the jaw 36a, which is pinned to the sleeve 36, as the latter moves inwardly. Thus rotation of the sleeve by the handle rotates the tape 30 and also the tape 31 through gears 50, 51. The handle is rotated until a cutting or other speed selected from the above series appears behind the window 19a whereupon the indications displayed in the window 6 indicate the settings for one or more control handles and/or any other desired reading. The tapes, gears and pulleys are enclosed in a casing 52 and a flange 53 may be secured to the spindle 49 to enable another indicating element (for example, the one shown in Fig. 15) to be linked up with the above element.

Figs. 7, 7a, 8 and 8a show another form of control indicator. In this case there are provided five concentrically mounted and rotatable discs, the inner three discs 54, 54a and 54b bearing respectively the units, tens and hundreds of various available ranges of cutting speeds; these are rotatable respectively by the milled thumbscrew 54c and pegs 54d and 54e.

The disc 55 bears figures indicative of the various diameters of work which the machine can handle (or alternatively diameters of cutters).

The outer disc 56 bears the appropriate indications to be displayed depending upon the setting of the above mentioned discs. For this purpose the outer disc 56 forms the lip of a cup-shaped member 56a rotatable about the central spindle 57 secured to the casing 57a and is furnished with internal gear teeth 56b.

The work diameter disc 55 is also capable of rotation about the spindle 57 by means of the peg 55a. It is moreover interconnected with the outer disc 56 by means of the ratchet teeth 56c and the pawls 56d, so that when the disc 55 is rotated in an anti-clockwise direction, it carries with it the outer disc 56; if on the other hand it is rotated in a clockwise direction, the outer disc 56 will remain stationary.

Towards their centre, each of the discs 54, 54a and 54b is furnished with a sleeve carrying respectively gears 58, 58a and 58b, which are operatively geared to the internal gear teeth 56b by planetary pinions 58c, 58d and 58e, as best seen in Figs. 7a and 8.

The discs 55 and 56 are enclosed by an annular cover plate 59 furnished with a window 19a in register with the former disc and a window 59a in register with the outer disc 55.

The three discs 54, 54a and 54b are enclosed by a cover plate 60 supported by a bridge piece 60a rigidly secured to the spindle 57. The cover plate is furnished with three windows 60b in register with the three discs.

Assuming the operator desires to operate on work of 2 inch diameter, he rotates the work diameter disc 55 until the numeral 2 appears in the window 19a. He then rotates the units, tens and hundreds discs 54, 54a and 54b until the cutting speed, at which he wants to operate, appears in the windows 60b. Owing to the geared connection between the several discs, the outer disc 56 will be rotated to a position where an indication is displayed in the window 59a; as an example a triangle symbol is shown in the window. For the sake of clearness, no work diameter numerals or indications (with the exception of the aforesaid triangle symbol) are illustrated in the drawings.

In Figs. 9 and 10 the control indicator is of similar construction to the control dial shown in Fig. 4 but with the three windows 26, 27, 28 replaced by two windows 64, 65 each so shaped as to be a replica of a particular gate, slot or other positioning means for locating the control handle or handles of the machine tool. This construction enables the control handles to be set to the positions in their gates agreeing with the positions of indications appearing in the gate-shaped windows in the front plate 21.

In the modified arrangement of control indicator 66 shown in Figs. 11 to 13, a replica of the machine 67 is produced upon the front plate 21 showing the positions of all or some of the various control handles.

As shown in Figs. 12 and 13 the control indicator 66 is of dial formation and adapted for the machine spindle speed settings only. The replica is associated with four windows 67 to 70 having indication lines pointing to the replicas of the particular handles 71 to 74 which they control. The ring 22 is rotated by the knob 75 till the desired speed appears in the window 19a whereupon indications appear in the windows 67 to 70. The operator has then only to set the control handles on the machine proper to the positions indicated on the replica. The pointer 76 works in conjunction with the scale on the front plate 21, this scale indicating the serial number of the range of available speed settings.

In a modification, a shutter in the form of a plate (controlled by a knob accessible on the outer face of the indicator) may be adapted to mask certain windows when set in positions defined by characteristic markings. Said knob corresponds to a control handle on the machine furnished with similar characteristic markings.

The replica may be mounted in the vicinity of a control indicator carrying two or more relatively movable scales, which for the sake of example, are graduated respectively to carry the range of diameter in inches of the work, or diameters of cutters to be used, and cutting speeds of which the machine is capable. These scales may conveniently take the form of rotatable concentrically mounted dials, whilst the replica of the machine may be placed in the middle thereof in fixed relationship.

Assuming the operator desires to set the machine for operation on work, or use with a cutter, of 6 inch diameter, the material being such as to call for an economical cutting speed of 75 ft. per min., he then sets the two dials accordingly.

The action of setting the dial 25 (or dials if more than one is used) produces on the replica adjacent the appropriate control handles 71 to 74 depicted thereon, a visible indication by means of a distinctive color or symbol appearing in the windows 67 to 70. These visible indications show the operator the correct position on the replica to which the control handles 71 to 74 should be set to operate with a given cutter, or on the work in question and he has now only to set the control handles proper by moving them to positions indicated by corresponding visible indications located upon or adjacent to said control handles proper.

The replicas may coact with any number of dials and the information indicated as to the kind of material to be cut and/or the type of tool to be employed. For example, a carbon, high speed, or carbide tool may be required according to the work in hand, thus by adjusting the dial the requisite tool for brass, steel or other material is indicated in conjunction with the material indication. For such an arrangement one or more indicators bearing replicas may be used in conjunction with an indicator constructed similar to Figs. 7, 7ª, 8 and 8ª and provided with material indications on the disc 55 and tool indications on the disc 56. An indicator so equipped can be set to show tool, work and speed indications and the remaining indicator or indicators set to the speed indication shown by the first indicator.

Alternatively to the use of control indicators manufactured in the above manner, the scale proper may be an elongated graduated member movable in relationship to a fixed stop and adapted to rotate an indication disc or drum. This arrangement allows a workman to caliper a gauge or the work in hand, set the calipers against the fixed stop and adjust the scale accordingly or a cutter may be inserted between the fixed stop and the scale. The scale automatically turns the disc or drum and displays the correct indication.

Fig. 14 shows a modified control indicator of this kind which is of similar construction to the drum control illustrated in Fig. 2 except that the shutter 12 is rotated by the adjustable stop 77 instead of by the disc 15 which is replaced by a fixed plate 78 furnished with a stop 79. The adjustable stop 77 slides in guides 80 and the pendant pin 81 works in a cam groove 82 in the shutter 12 so as to rotate it as the stop 77 is moved. If desired the above graduated scale may be combined with the adjustable stop 77 which is moved along to any desired graduation.

In a further modification, the replica is dispensed with and the action of setting the control indicator automatically produces a visual indentification on or adjacent to the control handles proper to indicate the positions to which they should be moved.

A convenient construction is shown in Fig. 15 wherein a control indicator is located behind the control handles 83, 84 with windows 85, 86 in the outer casing 11 for displaying the positions the handles should occupy. Rotation of the disc 16 causes symbols or numerals to appear in the window 87 in the end casing 88 and indications to appear in the windows 85, 86 located behind the positions the handles should occupy. The indications are provided on an indicator spindle or tube 13 anchored to the disc 16.

Any of the windows provided in the various control indicators for displaying indications, symbols, numerals and other readings, may be distinctively shaped so as to aid in identifying the windows with certain control handles.

Alternatively, in the construction shown in Figs. 16 and 17 the action of setting the indicator, illuminates, by an arrangement of electric contacts 89, an electric lamp 90 behind a window or recess on or in association with each control handle to show the position to which it should be moved to deal with the particular work contemplated.

The illuminated indication may be distinctively marked, colored and/or distinctly shaped and when any control handle performs more than one function, more than one visual indication may be employed. Further, the illuminated indication may indicate the type of tool and material in a similar manner to that aforesaid. When the indication is by color, the lamps 90 may be dipped to produce the color required, or else the windows may be furnished with a colored transparent medium.

A suitable construction comprises a front plate 91 graduated with speed serial numbers, a pointer 92, and a contact arm 93 behind the plate adapted to engage the contacts 89 on a rear plate 94. As contact is made at any given position on the indicator, electric lamps 90 are illuminated behind certain of the windows 95, 96, 97, 98 adjacent the control handles 71 to 74 to show the positions into which such handles should be moved.

In order to enable any particular indication to be altered, the windows 95 to 98 may take the form of removable inserts, so as to enable inserts of a different shape and/or color, or furnished with a different marking, to be fitted.

The indications may be rendered suitable for the machine to be operated by a color blind person by adopting a distinctive shape as well as a distinctive color. For example a green window might always be triangular, whilst a red window might always be square and an orange window might be round and so on.

If movable stops are used as above set forth, they may also be distinctively colored and/or shaped.

What I claim and desire to secure by Letters Patent is:—

1. In a machine tool, a plurality of control handles each movable to different positions to control the operation of the machine, and an indicator at each different position of each handle for facilitating the adjustment thereof, said indicators being of different color and each indicator for a handle being a color differing from the color of all other indicators for that handle.

2. The invention as claimed in claim 1, wherein the shape of each colored indicator associated with a handle differs from the shape of all other colored indicators for that handle.

3. A control indicating device for use with a machine tool having one or more handles each movable to different positions designated on the machine by differently colored indicators to control the operation of the machine, said indicating device comprising a plurality of members relatively adjustable to a plurality of different relationships each corresponding to an operating condition of said machine, cooperating indicia on said relatively adjustable members adapted to be selectively alined to set said members in accordance with the desired operating condition of the machine, and a plurality of differently colored indicators selectively displayed in accordance with the selected adjustment of said members, said indicators identifying the positions to which the handle or handles of the machine tool must be adjusted to establish the desired operating conditions.

4. A control indicating device for use with a machine tool having a part adjustable to different positions to control the operation of the machine, the machine having thereon colored designations indicating a position of adjustment for the part, said control device including a relatively stationary apertured member, means carried by said member for mounting the same upon the machine with which the indicator is to be used, a second member adjustable with respect to said stationary member and having a portion movable behind an aperture of the stationary member, cooperating indicia on said members for setting said relatively movable member to positions corresponding to different operating conditions of the machine tool, and colored indicators on the said portion of said relatively movable member, each colored indicator being identical with one of the colored designations on said machine and being selectively positioned for view through the aperture of the stationary member in accordance with the adjustment of the movable member.

5. A control indicating device for use with a machine tool having a part adjustable to different positions to control the operation of the machine, said control device including a relatively stationary apertured member carrying a replica of at least a portion of the machine, the aperture of said member being located adjacent the illustration of said adjustable part of the machine, a second member adjustable with respect to said stationary member and having a portion movable behind an aperture of the stationary member, cooperating indicia on said members for setting said relatively movable member to positions corresponding to different operating conditions of the machine tool, and colored indicators on the said portion of said relatively movable member, each colored indicator being selectively positioned for view through the aperture of the stationary member in accordance with the adjustment of the movable member.

6. The invention as claimed in claim 5, wherein the machine tool has a plurality of parts adjustable to different positions to control the operation of the machine, and wherein the said stationary member has a plurality of apertures each adjacent the illustration of the corresponding adjustable parts in said replica of the machine tool appearing on the said stationary member, and said movable member has a set of differently colored indicators selectively visible through each aperture.

7. The invention as claimed in claim 5, wherein the machine tool has a plurality of parts adjustable to different positions to control the operation of the machine, and wherein the said stationary member has a plurality of apertures each adjacent the illustration of the corresponding adjustable parts in said replica of the machine tool appearing on the stationary member, and said movable member has a set of differently colored indicators selectively visible through each aperture, in combination with an additional aperture in said stationary member, and a set of numerical indications carried by said movable member and selectively visible through said additional aperture, said numerical indications corresponding to the speed of an element of the associated machine tool.

8. The invention as claimed in claim 5, wherein the shape of said aperture of the stationary member is a replica of the path of movement of the corresponding adjustable part of the machine, and the colored indicators are positioned on said movable member for selective display in the portion of said aperture corresponding to the desired location of the said part.

9. A control indicating device for use with a machine tool having a plurality of parts each adjustable to different positions to control the operation of the machine, the machine having thereon colored designations indicating a position of adjustment for the parts, said control device comprising a relatively stationary disk member having an aperture corresponding to each part, means carried by said member for mounting the same upon the machine with which the indicator is to be used, a member movable behind said stationary member, cooperating indicia on said members for setting said movable member to positions corresponding to the several operating conditions of the machine tool, and sets of colored indicators on said movable member for selective display at the respective apertures in accordance with setting of the movable member, the indicators of each set being each of a different color, and each set including a colored symbol identical with each colored designation on the machine which indicates a position of adjustment of one of said parts.

10. A control indicating device for use with a machine tool having one or more parts each adjustable to different positions to control the operation of the machine, said control device comprising a relatively stationary disk member having an aperture corresponding to each part and carrying a replica of at least a part of the machine, the apertures being each located adjacent the illustration of the corresponding adjustable part, a member movable behind said stationary member, cooperating indicia on said members for setting said movable member to positions corresponding to the several operating conditions of the machine tool, and sets of colored indicators on said movable member for selective display at the respective apertures in accordance with setting of the movable member, the indicators of each set being each of a different color.

11. The invention as claimed in claim 10, wherein a replica of the machine tool appears on the said disk member, and the said apertures are each adjacent a handle depicted on the replica, in combination with an additional aperture extending through said disk member, and a set of numerical indications on said movable member and selectively visible through said additional aperture, said numerical indications each corresponding to one of the operating conditions of the machine.

12. A control indicating device for use with a machine having a plurality of handles each adjustable to different positions designated on the machine by differently colored indicators to control the operation of the machine, said control device comprising a plurality of telescoped and angularly adjustable cylinders, the outer cylinder having an aperture for each of the adjustable control handles of the machine, cooperating indicia for setting said adjustable cylinders for the desired one of a plurality of operating conditions of the machine, and sets of colored indicators on the inner cylinder in alinement with the apertures of the outer cylinder, the colored indicators of each set being each of a different color, whereby the desired setting of each control handle of the machine is indicated by the colored indicators displayed in the apertures of the outer cylinder.

13. The invention as claimed in claim 12, wherein there are three telescoped cylinders, the outer cylinder has an elongated slot and the intermediate cylinder has a series of spaced openings, and the inner cylinder has a series of numerical indications selectively visible through the spaced opening of the intermediate cylinder which is alined with the slot of the outer cylinder.

14. In a machine tool, the combination with a control handle adjustable to different positions to control the operation of the machine, and indicating means of different colors adjacent each of the different positions of adjustment of the handle, of a control indicating device including members relatively adjustable into different relationships each corresponding to an operating condition of the machine, and means controlled by the adjustment of said members for selectively displaying the color corresponding to the adjustment of the said handle appropriate for the operating condition for which said members are adjusted.

15. The invention as claimed in claim 14, wherein said indicating means includes an electric lamp adjacent the said different positions of the handle, and said means controlled by the adjustment of said members comprises switches for selectively connecting said lamps to an energizing source in accordance with the setting of said relatively adjustable members.

16. The invention as claimed in claim 14, wherein said indicating device comprises a pair of relatively adjustable members, one of said members being apertured, the other member carrying a series of indicia corresponding to different operating conditions of the machine and a series of colored indicator symbols selectively positioned thereon for display through the aperture in the first member in accordance with the adjustment of said members as indicated by said indicia of the second member.

17. The invention as claimed in claim 14, wherein said machine includes a plurality of adjustable control handles, and said indicating device includes a relatively fixed apertured member, a plurality of additional members adjustable with reference to the first member and carrying symbols for display through the apertures thereof, and means for adjusting at least two of said additional members simultaneously to display through two apertures of the first members symbols indicating operating conditions of the machine and a corresponding adjustment for at least one of said handles.

18. The invention as claimed in claim 14, wherein said machine includes a plurality of adjustable control handles, and said indicating device includes a relatively fixed apertured member, a plurality of additional members adjustable with reference to the first member and carrying symbols for display through the apertures thereof, and means for adjusting at least two of said additional members simultaneously to display through two apertures of the first members symbols indicating operating conditions of the machine and a corresponding adjustment for at least one of said handles, and means operable to retain one of said additional members in fixed position to indicate a predetermined operating condition of the machine while adjusting a plurality of said additional members to indicate a plurality of corresponding sets of adjustments for a plurality of said control handles of the machine.

GUY LESLIE MURRAY.